United States Patent Office 3,528,853
Patented Sept. 15, 1970

3,528,853
METHOD OF PRODUCING A DRIED STARCH PRODUCT
Charles H. Pelton, Clinton, Iowa, assignor to Standard Brands Incorporated, New York, N.Y., a corporation of Delaware
No Drawing. Filed Apr. 12, 1968, Ser. No. 721,054
Int. Cl. C08b 25/02; C131 1/08
U.S. Cl. 127—71                                     6 Claims

ABSTRACT OF THE DISCLOSURE

Wet common starch containing small amounts of gelatinized starch is extruded into nonfriable forms. These nonfriable forms may be dried without substantial dusting of the dried starch occurring.

---

This invention relates to a method of producing a dried starch product. More particularly, the invention relates to a method of forming starch into nonfriable, predetermined sizes and shapes which can be dried without substantial dusting of the dried starches occurring.

In the past, dried common starch has been produced by providing a starch slurry which is partially dewatered, for instance, by the use of continuous vacuum drum filters and removing the starch from the filters in the form of a starch cake approximately one-quarter to three-quarters of an inch thick. The starch cake is scored or cut by the use of multiple vertical rotary cutters. This practice results in pieces of starch cake of irregular size and shape with a relatively large amount of starch fines being present due to the friable nature of the starch cake. The starch is then dried, for instance, in a forced hot air drier. Because of the irregular size and shape of the pieces of the starch cake, the moisture content of the starch pieces after drying will not be the same throughout; for instance, the center of the large pieces may contain 25 to 30 percent by weight moisture, whereas the surfaces of such pieces may contain less than about 5 percent by weight moisture. The varying moisture content of the dried pieces necessitates thorough mixing of the starch in order to provide a starch product having essentially the same moisture content throughout. Moreover, the varying size and shape of the pieces of the starch cake present a manufacturing problem in that it is difficult to maintain a starch drier at predetermined conditions so as to provide a dried starch with essentially the same moisture content on a regular basis.

Dried common starch also presents the disadvantage that it is exceedingly dusty. The dusty nature of dried starch results in relatively large amounts of starch being lost when it is handled, for instance, when it is bagged or otherwise packaged.

It is the principal object of the present invention to provide a method of producing starch in substantially nonfriable forms for subsequent drying.

It is a further object of the present invention to provide a method of producing starch in nonfriable forms which after drying are significantly less dusty than dried common starch produced by prior art starch drying methods.

A still further object of the present invention is to provide a method of producing starch in nonfriable forms which after drying are significantly less dusty than common starch produced heretofore and which may be used for essentially the same purpose as dried common starch produced by prior art starch drying methods.

These and other objects are attained in accordance with the present invention by providing an intimate mixture of wet common starch and a small amount of gelatinized starch, extruding the mixture and drying the extruded product. The amount of gelatinized starch present in the mixture is effective to provide a nonfriable extruded product. The extruded product when dried will be less dusty than dried common starch produced by prior art methods.

The term "common starch" is defined herein as starch which is nonheat-treated, ungelatinized, unmodified or otherwise altered by heating or chemical treatment.

The common and gelatinized starches used in the method of the present invention include, for instance, corn, milo, sorghum, wheat, potato, tapioca, yucca and the like.

The gelatinized starch may be provided in the common starch by separately producing a gelatinized starch and mixing it with common starch to provide the necessary mixture or it may be provided by subjecting common starch to controlled gelatinization conditions so that the common starch is gelatinized to only a slight degree.

When the gelatinized starch is incorporated into partially dewatered common starch, i.e., starch after filtration, it is preferred that the gelatinized starch be of a particle size such that substantially all of it will pass through a 200 mesh U.S. standard screen. The amount of moisture present in the partially dewatered common starch is not critical but it is envisioned that starch having a moisture content between about 34 and about 44 percent may be used, since these are the approximate moisture levels that are normally obtained when starch is partially dewatered on vacuum filters or in centrifuges commonly used in starch processing. If desired, the gelatinized starch may also be incorporated into a common starch slurry, before it is filtered or centrifuged. The amount of gelatinized starch which is added to a starch slurry should be insufficient to substantially interfere with the normal dewatering characteristics of the common starch.

Preferably, the amount of gelatinized starch needed to provide sufficient extrudability to the mixture is between about a trace and about 5 percent, based on the dry substance weight of both the gelatinized starch and common starch present in the mixture. Typically, the amount of gelatinized starch present is from about 0.25 to about 1.6 percent on the same weight basis. These amounts of gelatinized starch will permit the common-gelatinized starch mixture to be extruded into nonfriable forms which may be dried without any or with very little fines being produced. The extruded products may also be dried at increased drying rates. The dried product will be significantly less dusty than common dry starch produced by prior art drying methods while still utilizable in substantially the same commercial applications as such prior art dried common starch.

The increased drying rate of the extruded product produced by the method of the present invention is the result of the production of substantially standard size starch forms and less starch fines being present in the drier. This results in less blockage of the hot air that is passed through the bed of starch. For example, it has been observed that in conventional starch drying practice where irregularly sized pieces of wet starch cake which are approximately one-quarter to three-quarters of an inch thick, three-eighths to one inch wide, and one-half to two inches long were randomly loaded into a drier tray to a depth of from about two to five inches, the bed of starch had only about 38 percent void space. On the other hand, when the same weight of an extruded starch product produced by the method of the present invention and having a diameter of three-sixteenths of an inch and length of about three-sixteenths to one half inch was loaded into a drier tray, the bed of starch had a void space of between 50 and 56 percent. This increased void space enables the extruded starch product to be dried at increased rates which permit a concomitant increase of output of dried starch by the drier. For instance, when the starch drier trays indicated above loaded into a forced hot-air laboratory drier, the starch product of the present invention dried 1.5 to 1.9 times faster than the starch product made in the conventional manner, based on approximately the same moisture levels being obtained in both products.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are intended to refer to percent by weight on a dry substance basis, and screen sizes are U.S. standard unless otherwise specified.

EXAMPLE I 4,510 mls. of a common corn starch slurry at 23° Baumé and 100° F., which constains 5 pounds dry substance starch, was divided into five equal portions. Each portion was treated as follows:

(A) The slurry was vacuum filtered on a 9.0-centimeter diameter Büchner funnel to obtain a starch cake containing 43.6 percent moisture. A portion of this cake was air dried to approximately 11 percent moisture. The remaining portion of the cake was extruded by the use of a screw type extruder through a flat plate die having three-sixteenths inch diameter holes and air dried to approximately 11 percent moisture.

(B) The slurry was treated as above and the wet starch cake mixed with 2.48 grams gelatinized starch having a moisture level of 8.3 percent and a particle size such that zero percent remained on 100 mesh screen, 8 percent on a 200 mesh screen, and 92 percent passed through a 200 mesh screen. The wet starch cake contained about 0.5 percent by weight gelatinized starch based on the weight of dry common starch. This mixture was extruded and dried as above.

(C) A starch product was prepared as in B above except the level of gelatinized starch was 1 percent by weight based on the weight of the dry common starch.

(D) The slurry was mixed with a water slurry of gelatinized starch containing sufficient gelatinized starch to obtain a level of 3.5 percent by weight gelatinized starch based on the dry weight of the common starch in the slurry. This slurry was filtered, and a portion of the cake extruded and dried as above. The other portion of the cake was not extruded prior to drying.

(E) Starch products were prepared as in B above except that the amount of gelatinized starch added was sufficient to obtain a level of 1 percent by weight gelatinized starch based on the dry weight of the common starch in the slurry.

The control sample A, which contained no gelatinized starch, was extremely friable and after drying was very dusty. All the extruded and dried products containing gelatinized starch were less dusty than the air-dried starch cake products which contained gelatinized starch but which were not extruded. The products which were the least dusty were the extruded products prepared by adding the gelatinized starch to the wet starch cake prior to extrusion.

EXAMPLE II

A common corn starch slurry was vacuum filtered on a 9.0-centimeter diameter Büchner filter to a moisture level of approximately 43 percent, and portions thereof mixed with gelatinized starch of a particle size such that zero percent remained on 100 mesh screen, 8 percent on a 200 mesh screen, and 92 percent passed through a 200 mesh screen. One portion of the cake contained 0.25 percent by weight gelatinized starch, and the other portion contained 0.50 percent by weight gelatinized starch based on the weight of the dry starch in the portions. The two portions of the starch cake were divided and extruded by the use of a screw type extruder through flat plate dies having three-sixteenth inch and three-eighths inch diameter holes respectively. The four extruded samples were placed in wood frames twelve inches by twelve inches by four inches deep with wire screen bottoms. The frames were placed onto a traveling conveyor screen which conveyed the frames through a Proctor & Schwartz traveling screen drier. The maximum air temperature that was reached in the drier was about 246° F. After about 33 minutes the starch samples were substantially bone dry, and contained no starch fines. The three-eighths inch diameter dried extruded product was slightly more dusty and less hard than the three-sixteenths inch diameter dried product. However, all the extruded products were harder and less dusty than the dried common starch produced by conventional means.

EXAMPLE III

A common corn starch slurry (21.4 Bé.) at a temperature of 110° F. was vacuum filtered on a Büchner filter, thereby obtaining a starch cake containing 42.3 percent moisture. Portions of this starch cake were mixed with sufficient gelatinized corn starch, having a moisture content of 9.1 percent, to achieve in one portion 0.54 percent gelatinized starch and in another 1.62 percent gelatinized starch by weight. The particle size of the gelatinized starch was such that zero percent remained on 40 mesh screen, 16 percent remained on 100 mesh screen, 20 percent remained on 140 mesh screen, 24 percent remained on 200 mesh screen, 20 percent remained on 325 screen and 20 percent passed through a 325 mesh screen. These starch samples were extruded by the use of a screw type extruder through flat plate dies having three-sixteenths inch and three-eighths inch diameter holes respectively. A control sample was prepared by extruding a portion of the starch cake containing no gelatinized starch through a die having three-sixteenths inch holes.

Another control sample was prepared by air drying a portion of the starch cake containing no gelatinized starch to a moisture level of 13 percent.

The samples containing the gelatinized starch extruded without difficulty. However, the sample containing no gelatinized starch was difficult to extrude, and localized heating of the sample occurred due to the excessive pressures necessary to extrude the same. This sample was considered unacceptable.

The extruded samples containing gelatinized starch were air dried to moisture levels shown below. These samples and the air dried starch cakes were evaluated by the following procedures:

One hundred grams of the air dried samples were gently hand screened on a 10 mesh screen. The weight of material which passed through the screen was considered as starch fines and was taken as an indication of the dustiness of the samples.

Fifty-gram portions of the samples which did not pass through the 10 mesh screen above were placed into a one-pint container of a Patterson-Kelly twin shell blender, Model No. LB-2180 with six one-inch glass balls and rotated for 15 minutes at a speed of 23.5 r.p.m. At the end of the rotation, the samples were gently hand screened on a 10 mesh screen and the weight of the material which passed through the screen was taken as an indication of the friability of the samples and was measured as percent attrition.

The results of these tests are shown in the following table:

TABLE I

| Sample | Die opening | Percent moisture | Added gelatinized starch (Percent dry basis) | Percent fines | Friability (percent attrition) |
|---|---|---|---|---|---|
| Common starch cake | Nonextruded | 13 | 0 | 46 | 97 |
| Common starch | 3/16" diameter | 12.5 | 0 | Unacceptable product (no test) | |
| Common starch and gelatinized starch. | 3/16" diameter | 12.7 | 0.54 | 4 | 3 |
| Do | 3/8" diameter | 12.9 | 0.54 | 8 | 20 |
| Do | 3/16" diameter | 13.1 | 1.62 | 3 | 2 |
| Do | 3/8" diameter | 13.3 | 1.62 | 3 | 5 |

From the table, it is readily seen that the method of the present invention provides a dried starch product which is essentially free of dust and which is substantially non-friable.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method of producing a starch product which is nonfriable and when dried will be substantially nondusting, comprising, providing an intimate mixture of wet common starch and from a trace to about 5 percent by weight gelatinized starch, extruding the mixture and drying the extruded product, the amount of gelatinized starch present being effective to impart to the extruded product the property of substantial nonfriability.

2. A method of producing a starch product as defined in claim 1, wherein the wet common starch has a moisture content between about 34 and about 44 percent by weight.

3. A method of producing a starch product as defined in claim 1, wherein the mixture is formed by incorporating the gelatinized starch into the wet common starch.

4. A method of producing a starch product as defined in claim 3, wherein the amount of gelatinized starch incorporated into the mixture is from about 0.25 to about 1.6 percent by weight.

5. A method of producing a starch product as defined in claim 3, wherein the gelatinized starch incorporated into the wet starch is of a particle size where substantially all of the same will pass through a 200-mesh U.S. standard screen.

6. A method of producing a starch product as defined in claim 5, wherein the starch mixture is extruded through an orifice having a diameter of from about three-sixteenths to about three-eighths of an inch.

References Cited
UNITED STATES PATENTS

| | | | |
|---|---|---|---|
| 2,098,293 | 11/1937 | Jefferies | 127—32 |
| 2,178,235 | 10/1939 | Lauterbach | 127—32 |
| 3,173,807 | 3/1965 | Marotta | 127—71 X |

MORRIS O. WOLK, Primary Examiner

S. MARANTZ, Assistant Examiner

U.S. Cl. X.R.

127—32